United States Patent [19]
Brehm et al.

[11] Patent Number: 5,436,999
[45] Date of Patent: Jul. 25, 1995

[54] PREPARATION AND EXECUTION METHODS FOR SPLICING AN INTEGRATED OPTICAL DEVICE TO AN OPTICAL FIBER CABLE AND CONNECTION SUBASSEMBLIES FOR USE THEREIN

[75] Inventors: Claude Brehm, Montrouge; Philippe Dupont, Antony; Andre Tardy, Egly, all of France

[73] Assignee: Alcatel N.V., Amsterdam, Netherlands

[21] Appl. No.: 118,595

[22] Filed: Sep. 10, 1993

[30] Foreign Application Priority Data
Sep. 11, 1992 [FR] France ............... 92 10855

[51] Int. Cl.⁶ .................................... G02B 6/38
[52] U.S. Cl. ........................... 385/95; 385/98; 385/96; 385/97; 385/99
[58] Field of Search ............... 385/95–99, 385/114, 59, 65, 83, 71, 136

[56] References Cited
U.S. PATENT DOCUMENTS

| | | | |
|---|---|---|---|
| 4,730,198 | 3/1988 | Brown et al. | 350/96.20 |
| 4,801,191 | 1/1989 | Nakai et al. | 385/71 X |
| 4,818,058 | 4/1989 | Bonanni | 385/71 |
| 5,134,673 | 7/1992 | Stephenson et al. | 385/186 X |
| 5,183,489 | 2/1993 | Brehm et al. | 385/98 X |
| 5,274,724 | 12/1993 | Brehm et al. | 385/98 X |

OTHER PUBLICATIONS
French Search Report 9210855 dated May. 19, 1993.

Primary Examiner—Frank Gonzalez
Assistant Examiner—Phan T. H. Palmer
Attorney, Agent, or Firm—Sughrue, Mion, Zinn, Macpeak & Seas

[57] ABSTRACT

A method of preparing a subassembly for connecting an integrated optical device (21) to an optical cable:
- a multiferrule is used having internal passages (2) opening onto its opposite first and second faces (6, 7),
- an intermediate optical cable is used,
- the intermediate fibers (27) are inserted into the passages (2) through the first face (6),
- the fibers (27) are fixed in the passages (2) over part of their length,
- the multiferrule and the fixed fibers (27) are cut to obtain a multiferrule section (34) in which the fibers are partly fixed,
- the fixed fibers (27) in the section (34) are connected to the device (21),
- the fibers (27) are cut near the second face (7) and removed to leave the passages (2) partially empty to produce the connection subassembly (36).

26 Claims, 6 Drawing Sheets

PREPARATION AND EXECUTION METHODS FOR SPLICING AN INTEGRATED OPTICAL DEVICE TO AN OPTICAL FIBER CABLE AND CONNECTION SUBASSEMBLIES FOR USE THEREIN

BACKGROUND OF THE INVENTION

The present invention concerns methods of preparing a subassembly for splicing an integrated optical device to at least one optical fiber cable, this cable being more particularly, although not exclusively, in the form of a ribbon cable comprising a plurality of single-mode fibers disposed parallel to each other with their axes coplanar. The present invention also concerns a method of splicing this subassembly to one or more optical fiber cables and connection subassemblies for use in this method.

Multifiber cables will be used for future multiservice optical networks. Connecting one or more such cables to an integrated optical device incorporating waveguides poses problems in terms of cost, optical quality and ease of use.

Because the optical energy is highly confined in an optical fiber, connecting an optical fiber to a waveguide requires dimensional tolerances in the order of one micrometer. The simultaneous connection of several fiber/waveguide combinations naturally increases the difficulty, all the more so in that economic objectives require a low-cost connection device suitable for use by relatively unskilled personnel under difficult outdoor working conditions, and in particular in trenches, in other words on site.

Currently an operator places the ends of the fibers of the cable into V-shaped grooves etched chemically into one face of a silicon primary plate; a complementary plate immobilizes the fibers. Correct alignment of the fibers and the guides requires the use of complex and costly means. The ends of the fibers must be optically polished, by means of a long and delicate operation. The assembly system is difficult and costly.

SUMMARY OF THE INVENTION

An object of the present invention is to provide a method whereby the process of connecting an optical fiber cable to an integrated optical device is considerably simplified and in particular so that the connection can be done on site without needing the long and costly optical polishing operation.

In one aspect the present invention consists in a method of preparing a subassembly for splicing an integrated optical device to at least one optical fiber main cable characterized in that:
a multiferrule is used which is made from a vitreous material having a series of parallel internal passages opening onto opposite first and second faces,
an optical fiber intermediate cable is used comprising the same number of intermediate fibers as said main cable comprises fibers,
the stripped end of each of said intermediate fibers is inserted via said first face into a respective one of said passages so that said ends extend to the vicinity of said second face,
said intermediate fibers are fixed in said passages over a distance less than the length of said passages so that a portion of said fibers near said second face is not fixed in said passages,
said multiferrule and said intermediate fibers are cut transversely to said intermediate fibers at a cross-section in which said fibers are fixed to obtain a first multiferrule section in which said fibers are partially fixed and comprising said second face and a second section which comprises said first face and which is discarded,
said first section is connected to one face of said integrated optical device so that the ends of said cut fibers are flush with the face of said first section opposite said second face in alignment with the waveguides of said integrated optical device,
said fibers are cut transversely at a cross-section near said second face and where said fibers are not fixed in said passages and the cut fibers are removed to leave said passages empty over part of their length to produce said connection subassembly.

In this first method, said waveguides of said integrated optical device are so disposed that their axes are coplanar, the distance between two consecutive waveguides in said plane is the same for all said waveguides and equal to the diameter of said intermediate fibers before stripping and the diameter of said waveguides is substantially equal to the diameter of said intermediate fibers after stripping.

In a second aspect, the present invention consists in a method of preparing a subassembly for splicing an integrated optical device to at least one optical fiber main cable in which method:
a multiferrule is used made from a vitreous material having a series of parallel internal passages in a common diametral plane opening onto opposite first and second faces, said multiferrule having a slot parallel to the plane of said passages into which said passages open,
an optical fiber intermediate cable is used comprising the same number of intermediate fibers as said main cable comprises fibers,
the stripped end of each of said intermediate fibers is inserted via said second face into a respective one of said passages so that said ends extend to the vicinity of said first face,
a force is applied to said intermediate fibers in a direction orthogonal to the plane of said passages to urge their end portions near said first face into said slot and into contact with one side of said slot parallel to the plane of said passages,
at least one block is inserted through said first face into said slot to move said end portions closer together so that at a cross-section near said first face said intermediate fibers are in contact with each other,
said block is fixed in said multiferrule and said intermediate fibers are fixed in said passages over a length less than that of said passages so that a portion of said fibers near said second face is not fixed in said passages,
said block, said multiferrule and said intermediate fibers are cut transversely to said intermediate fibers at a cross-section in which said fibers are fixed and in contact with each other to obtain a first multiferrule section in which said fibers are partially fixed and comprising said second face and a second section which comprises said first face and which is discarded,
said first section is connected to one face of said integrated optical device so that the ends of said cut fibers are flush with the face of said section opposite said second face in alignment with the waveguides of said integrated optical device, said fibers are cut transversely at a cross-section near said second face and where said fibers are not fixed in said passages and the cut fibers are removed to leave said passages empty over part of their length to produce said connection subassembly.

Said force may be applied to said intermediate fibers by means of at least one rod housed in a groove orthogonal to the plane of said passages, opening at the bottom into said passages and on the opposite side of the plane of said passages to the side of said slot against which said end portions are urged.

To facilitate the previous operation, said intermediate fibers may be retained by means of at least one cylindrical rod housed in a groove orthogonal to the plane of said passages, opening at the bottom into said passages and on the same side of the plane of said passages as the side of said slot against which said end portions are urged.

Two blocks may be inserted into said slot on either side of said intermediate fibers so as to center said intermediate fibers in said slot. The block or blocks may be made from a vitreous material identical to that of said multiferrule.

In the second method of the invention, said waveguides of said integrated optical device are disposed so that their axes are coplanar, the spacing between two consecutive waveguides in said plane is the same for all said waveguides and equal to the diameter of said intermediate fibers after stripping and the diameter of said waveguides is substantially equal to the diameter of said intermediate fibers after stripping.

In a third aspect the present invention consists in a method of preparing a subassembly for splicing an integrated optical device to at least two optical fiber main cables in which method:

a multiferrule is used made from a vitreous material having two series of parallel internal passages in two separate parallel planes, said passages opening onto opposite first and second faces of said multiferrule which is formed by assembling together two primary multiferrules each comprising one of said series of passages, one of said primary multiferrules being shorter than the other so that said first face at the level of said first series is set back relative to said first face at the level of said second series, the passages of said second series opening in the vicinity of said first face into a slot parallel to their plane, having a width equal to the sum of the diameters of all the passages and opening towards said second series, the portion of said multiferrule between said first and second series forming a surface inclined to the planes of said first and second series, two intermediate cables are used each comprising the same number of intermediate fibers as there are fibers in one of said main cables, the stripped end of each of said intermediate fibers is inserted into a respective one of said passages via said second face so that said ends reach as far as the vicinity of said first face and the intermediate fibers of each of said intermediate cables are in respective passages of both said series, an appropriately shaped block is used to urge said intermediate fibers of said first series against said inclined surface so that their ends are in the plane of said intermediate fibers of said second series and interleaved therewith in said slot so that said intermediate fibers are all in contact with each other, said intermediate fibers are fixed in said passages over a distance less than the length of said passages so that a portion of said fibers near said second face is not fixed in said passages, said multiferrule, said block and said intermediate fibers are cut transversely to said intermediate fibers at a cross-section in which said fibers are fixed and all in contact with each other to obtain a first multiferrule section in which said fibers are partially fixed and comprising said second face and a second section which comprises said first face and is discarded, said first section is connected to one face of said integrated optical device so that the ends of said cut fibers are flush with the face of said section opposite said second face in alignment with the waveguides of said integrated optical device, said fibers are cut transversely at a cross-section near said second face where said fibers are not fixed in said passages and the cut fibers are removed to leave said passages of said first and second series empty as far as a central part of said multiferrule to obtain said connection subassembly.

In this third method, the number of said waveguides of said integrated optical device is equal to the number of said intermediate fibers of said two intermediate cables and said waveguides are disposed so that their axes are coplanar, the spacing between two consecutive waveguides in said plane is the same for all said waveguides and equal to the diameter of said intermediate fibers after stripping and the diameter of said waveguides is substantially equal to the diameter of said intermediate fibers after stripping.

Whichever method is used, said integrated optical device may be connected at its other face onto which said waveguides open to one or more other optical fiber intermediate cables by a method identical to that used to connect the first optical fiber intermediate cable or cables to said integrated optical device and said subassembly then comprises said integrated optical device connected to intermediate cables on either side by means of two multiferrules.

The method for connecting a subassembly to at least one optical fiber main cable may comprise the following operations:

the stripped ends of each of said main fibers of said main cable are inserted into respective passages via said second face of said subassembly so that said ends reach as far as said intermediate fibers, said main fibers are immobilized in said passages, said multiferrule and said main fibers and said multiferrule and said intermediate fibers are cut transversely to said fibers at two cross-sections in which said fibers are fixed to obtain two multiferrule sections respectively attached to said main cable and to said integrated optical device and an intermediate section which is discarded, said two multiferrule sections are aligned in a splicing body by guiding exterior reference faces of said sections and, before contact is established, a gel is injected into said body for matching the refractive indices at the interfaces of said fibers.

This method uses two multiferrule sections derived from the same original multiferrule and initially in parts of the latter that are very close together, for example about ten millimeters apart. Consequently, these two sections have intrinsically the same geometrical characteristics in respect of their internal passages and their external reference faces; any discrepancies are within the tolerances enabling very good optical coupling to be achieved.

An adhesive polymerized by ultraviolet light may be introduced into said passages before said fibers are inserted therein in order to fix said fibers in said multiferrule.

Cutting said multiferrule into sections is advantageously facilitated by weakened areas transverse to said passages.

Parallel cutting grooves orthogonal to the plane of said passages and opening into said passages may be provided for cutting said sections.

Additional grooves may be provided for creating weakened areas in line with said cutting grooves and on the opposite side of said multiferrule.

Said additional grooves may have an asymmetric V-shape.

Said second face of said subassembly advantageously has a bearing surface for the insulative material sheaths of said main cables.

The ends of said passages may be chamfered to facilitate inserting said fibers.

For cutting said intermediate fibers before removing them to leave said passages empty as far as a central part of said multiferrule, a groove is made in the latter orthogonal to the plane of said passages, opening into said passages and at the cutting cross-section.

In an improved method, to cut said multiferrule and said fibers at the same cross-section, said fibers are first cut while curved and said multiferrule is cut after said fibers are cut.

Other features and advantages of the present invention will emerge from the following description of various embodiments given by way of non-limiting illustrative example only.

DESCRIPTION OF PREFERRED EMBODIMENTS

In all these figures common items carry the same reference numbers.

Figure 1:
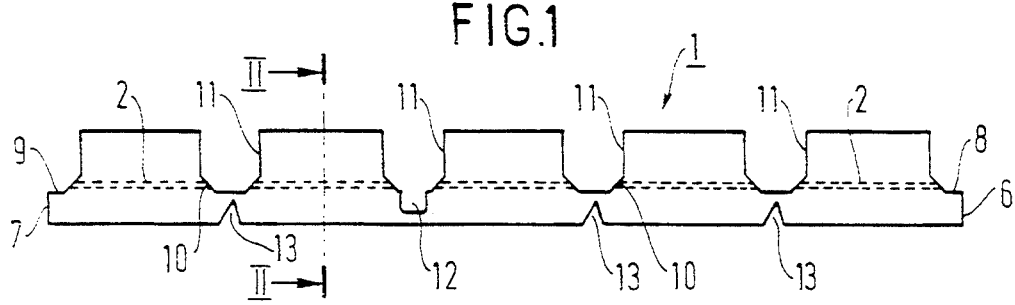
FIG. 1 is a diagrammatic view in elevation of a multiferrule used in a first embodiment of the method in accordance with the invention.
Figure 2:
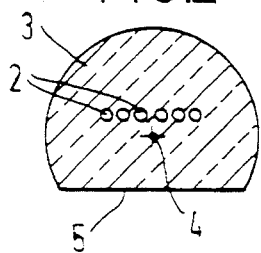
FIG. 2 is a view in cross-section on the line II—II in FIG. 1.
Figure 3:
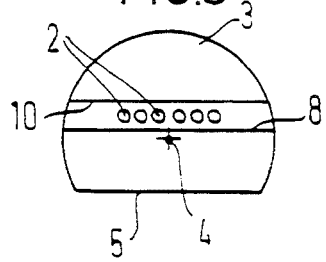
FIG. 3 is a side view of the multiferrule from FIG. 1.

FIGS. 1 through 3 show a multiferrule 1 made from silica glass or any other vitreous material comprising a series of parallel and (in this example) coplanar capillary passages 2.

A multiferrule of this kind is the subject matter of European patent application EP-A-0 484 850.

It has an exterior surface 3 which is part of a 3 mm diameter cylinder with an axis 4 and a plane exterior surface 5 approximately 2.5 mm wide. The surfaces 3 and 5 are reference faces. The multiferrule is 50 mm long.

Figure 4:
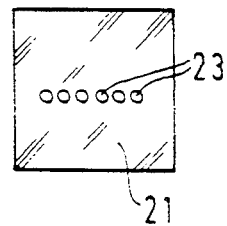
FIG. 4 is a view in transverse cross-section of an integrated optical device used in a first embodiment of the invention.
Figure 6:
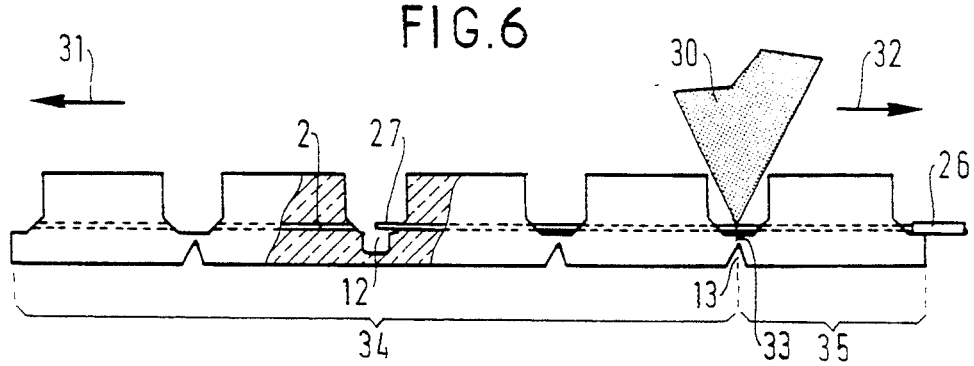
FIG. 6 shows the stage of cutting the multiferrule from FIG. 1.
Figure 7:
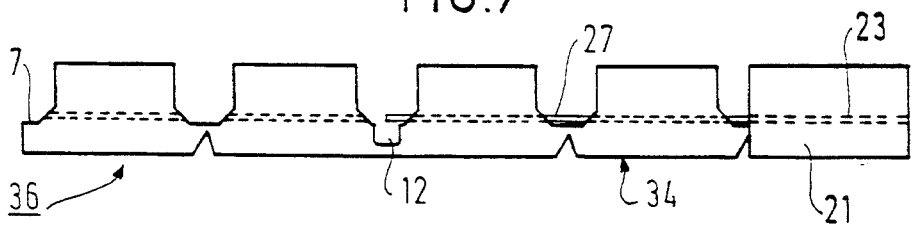
FIG. 7 shows the multiferrule from FIG. 1 connected to the integrated optical device from FIG. 4 to constitute a connection subassembly.

The plane of the passages 2 is near the diametral plane of the cylinder and parallel to the face 5. There may be six equidistant passages 2 spaced by 250 μm (the spacing is the distance between the axes of two consecutive passages), corresponding to the number of waveguides 23 and fibers 24 (FIG. 8) and their respective spacing in the integrated optical device 21 (see FIGS. 4 and 6) and the main cable 22 (FIG. 8) to be connected (see FIG. 7).

The cable 22 conventionally comprises six optical fibers 24 having a diameter including the cladding of 250 μm and a diameter excluding the cladding of 125 μm. The diameter of the waveguides 23 is 125 μm.

The end faces 6 and 7 of the multiferrule 1 are machined to provide a respective bearing surface 8, 9 for the cables to be connected. The distance between the surfaces 8 and 9 and the diametral plane of the passages 2 is 125 μm with a tolerance of +0, +25 μm. The entries of the passages 2 are chamfered at 10 to facilitate insertion of the fibers. For the same reason a machined oblique flat (no reference number) is provided at the entry to the passages 2.

The multiferrule 1 has a plurality of transverse grooves machined into it to weaken it so that it is easier to separate into sections subsequently.

Thus four 2 mm wide cutting grooves 11 are provided on 8 mm centers, orthogonal to the plane of the passages 2 and opening at the bottom into the passages 2. One of the grooves 11 communicates with a groove 12 which is also orthogonal to the plane of the passages 2 and opens into the passages 2. The groove 12 is on the opposite side of the diametral plane of the passages 2 to the grooves 11.

The chamfers 10 which facilitate entry of the fibers into their passages are preferably formed at the bottom of the grooves.

A tolerance in respect of the height of the grooves 11 of ±25 μm relative to the nominal dimension, which is that of the diametral plane of the passages 2, is acceptable. Further asymmetric V-shaped grooves 13 are machined into the face 5 in line with the grooves 11 except for that which communicates with the groove 12.

A low-viscosity adhesive polymerized by ultraviolet light may be introduced into the passages 2 of the multiferrule 1 just described, between its face 6 and its groove 12, after which the resulting component is packaged in an opaque plastics material tube and stored until subsequent use. The dimensional stability of the component is guaranteed by the nature of the material from which the multiferrule is made, namely silica glass, which has a very low coefficient of thermal expansion.

Figure 8:
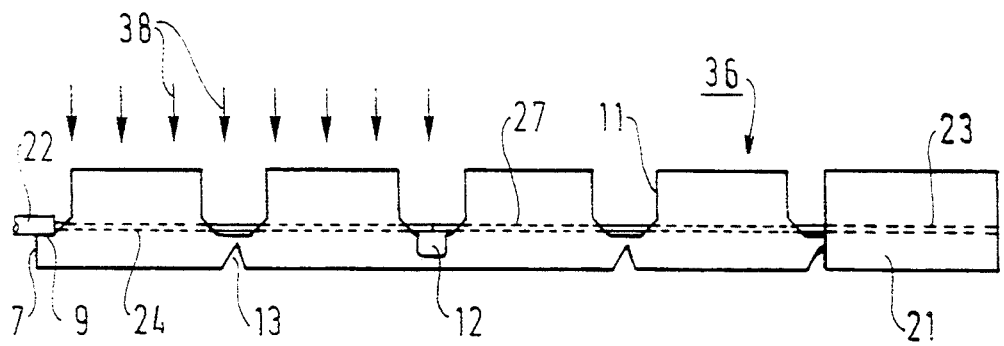
FIG. 8 shows the stage of inserting and immobilizing the main fibers in the connection subassembly from FIG. 7.

There now follows a description of the various phases of methods in accordance with the invention for preparing the connection and splicing subassembly for connection to an optical fiber cable in order to connect the integrated optical device 21 (of which one waveguide 23 can be seen in FIG. 7) to the ribbon cable 22 (of which one fiber 24 can be seen in FIG. 8).

Figure 5:
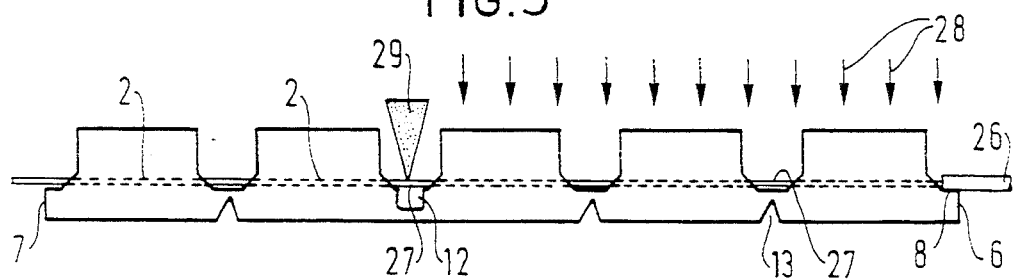
FIG. 5 shows the stage of immobilizing the intermediate fibers in the multiferrule from FIG. 1 and of cutting and removing part of the intermediate fibers.

The multiferrule 1 and an intermediate cable 26 seen in FIG. 5 and identical to the cable 22 are used to prepare a subassembly for connecting one face of the integrated optical device 21 to the cable 22. The cable 26 is first stripped by removing the plastics material coatings protecting the fibers 27 (only one fiber 27 can be seen in FIG. 5) over a given length with a wide tolerance on this length, in the order of ±1 mm. There are no special requirements as to the quality of the ends of the fibers 27: jagged ends are even tolerable.

The stripped fibers 27 are introduced collectively via the face 6 into the passages 2 of the multiferrule 1 containing the adhesive polymerized by ultraviolet light. This operation is facilitated by the compatible spacings of the fibers in the cable 26 and the passages 2 and by the presence of the chamfers 10.

The fibers 27 are inserted until the plastics material coating of the cable 26 bears against the surface 8, the stripped length of the fibers 27 being such that they are inserted into virtually all of the multiferrule 1, extending at least beyond the groove 12 and preferably projecting beyond the face 7 of the multiferrule 1. Adhesive applied to the surface 8 attaches the cable 26 to the multiferrule 1 and exposure to UV light (schematically represented by the arrows 28) fixes the fibers 27 in the passages 2 as far as the groove 12. The fibers 27 are not fixed in the passages 2 beyond the groove 12, i.e. near the face 7 of the multiferrule 1.

The fibers 27 are then cut transversely at the groove 12 using a diamond cutter 29 and the cut portions of the fibers that are not fixed are removed with the result that the passages 2 are empty from the second face 7 as far as a part of the multiferrule 1 in which the groove 12 is located. Once again, there is no specific requirement as to the quality of the ends of the fibers 27.

The multiferrule 1 attached to the cable 26 is then fixed in a tool (not shown). A diamond cutter 30 with a prism-shape cutting edge (with a prism angle of 60°, for example) is then used to score the surfaces of the fibers 27 at one of the grooves 11 where they are fixed to produce areas of weakness 33 (see FIG. 6). This is preferably done in such a way as to leave one groove 11 between the groove 12 and the weakened area 33.

The cutter 30 is suspended vertically with a return spring and mobile in the transverse direction, for example.

Lateral traction means schematically shown by the arrows 31 and 32 apply traction to the multiferrule 1 to initiate breakage at the scored area 33 associated with one of the V-shaped grooves 13.

This produces two sections 34 and 35 of multiferrule, the section 35 being attached to the cable 26. The fibers 27 have end faces flush with the cut end (opposite the face 7) of the section 34 of the optical quality required for optical coupling.

The integrated optical device 21 is then connected to the section 34 in such a way as to align the ends of the fibers 27 with the waveguides 23. Like all previously described operations, this operation is carried out at the manufacturing plant where the coupling between the integrated optical device 21 and the fibers 27 is adjusted by optimizing the light transmitted by each fiber/waveguide combination in such a way as to obtain a minimal attenuation for each joint.

A connection subassembly 36 (see FIG. 7) is made in this way in the manufacturing plant ready to be used in a simple and quick manner on site to connect the integrated optical device 21 to an optical fiber cable 22 (see FIG. 8).

Of course, the connection subassembly 36 may be used to connect the integrated optical device 21 to two optical fiber cables connected to respective ends of its waveguides 23. In this case all the operations described above are carried out to connect another intermediate cable to the device 21 to obtain a connection subassembly that is symmetrical relative to the device 21.

A connection subassembly may be prepared in the manufacturing plant by the above method without difficulty. As will now be explained, it facilitates the connection of an optical cable to an integrated optical device on site, i.e. under difficult outdoor conditions when delicate operations like those carried out to prepare the connection subassembly cannot be carried out quickly and simply by relatively unskilled personnel.

To connect the integrated optical device 21 to the cable 22 (and likewise to connect the device 21 to another cable at its other end), the first step is to strip the cable 22 over a given length with a tolerance on this length of ±1 mm. As with the ends of the fibers 7 of the intermediate cable 26, there is no particular requirement as to the quality of the ends of the fibers 24.

The ends of the prepared fibers 24 are collectively inserted via the face 7 of the subassembly 36 into the passages 2 containing the adhesive polymerized by ultraviolet light. As previously, this low-viscosity adhesive may be introduced after the connection subassembly 36 is made and the latter may be packaged in an opaque plastics material tube to be stored after it is manufactured in the manufacturing plant and until it is used on site, for example.

The fibers 24 are inserted until the plastics material coating of the cable 22 bears on the surface 9, the stripped length of the fibers 24 being such that they are inserted into the subassembly 36 as far as the groove 12 at which the ends of the fibers 27 are located. Adhesive applied to the surface 9 can be used to attach the cable 22 to the multiferrule and exposure to UV light (schematically shown by the arrows 38) bonds the fibers 24 into the passages 2.

The subassembly 36 attached to the cable 22 in this way is fixed in a tool similar to that used previously to fix the section 34. Two diamond cutters 39 and 40 (see FIG. 9) of the same type as the cutter 30 are then used to score the surfaces of the fibers 24 and 27 at the two grooves 11 on either side of the groove 12 (it is for this reason that a groove 11 is left between the weakened area 33 and the groove 12 when the cutter 30 is used) to create weakened areas 43 and 44.

Figure 9:
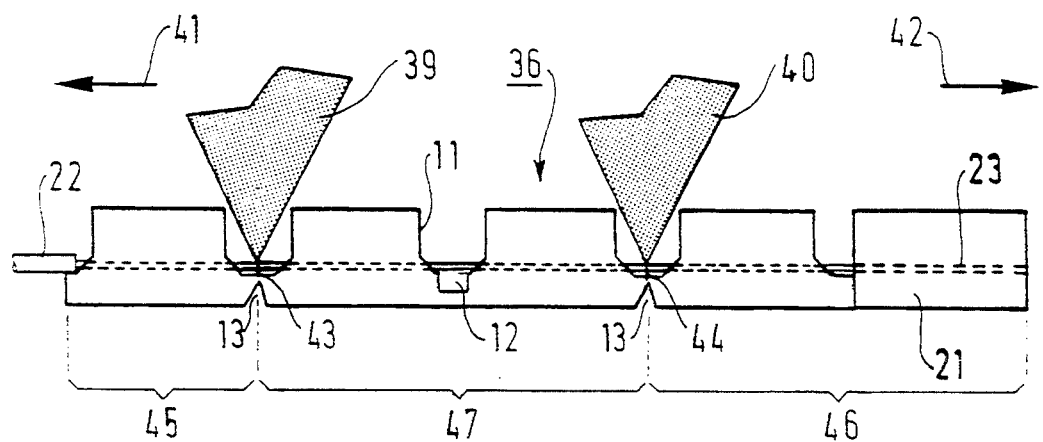
FIG. 9 shows the stage of cutting the connection subassembly from FIG. 7.

Once again, and as can be seen in FIG. 9, lateral traction means schematically represented by the arrows 41 and 42 apply traction to the subassembly 36 to initiate breakage at the scored areas 43 and 44 aligned with the V-shaped grooves 13.

Figure 10:
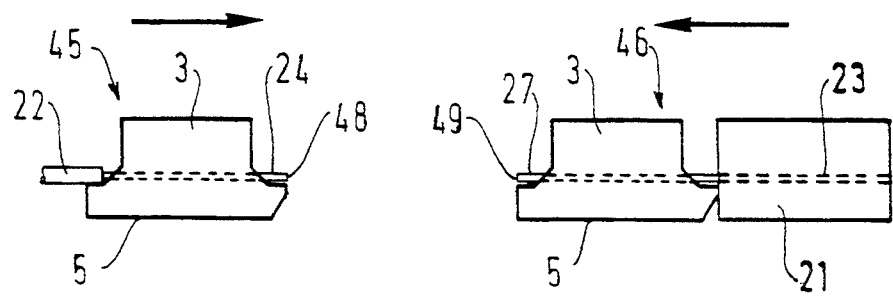
FIG. 10 shows the two multiferrule sections joined to the main cable and to the integrated optical device and separated from the intermediate section.

This yields two sections 45 and 46 of multiferrule respectively attached to the cable 22 and to the device 21 and an intermediate section 47 which is discarded. The respective end faces 48 and 49 of the fibers 24 and 27 have the optical quality required for optical coupling (see FIG. 10).

According to the invention, the two sections 45 and 46 have external reference faces 3 and 5 derived from closely adjacent areas of the same original multiferrule 1. The person skilled in the art knows how to manufacture multiferrules which have external dimensions and a parallel relationship between the axes of the passages 2 and the axis 4 which are sufficiently invariant over longitudinal distances of a few centimeters for satisfactory optical alignment to be achieved, as shown in FIGS. 11 and 12:
- the tolerances in respect of the diameter of the passages 2 are: 0, +1 $\mu$m,
- the spread of the positions of the axes of the passages 12 relative to the optimum plane as close as possible to each axis must be less than 10 $\mu$m,
- the spread of the spacings between the axes of the passages 2 in the direction of the above optimum plane is less than 10 $\mu$m.

Figure 11:
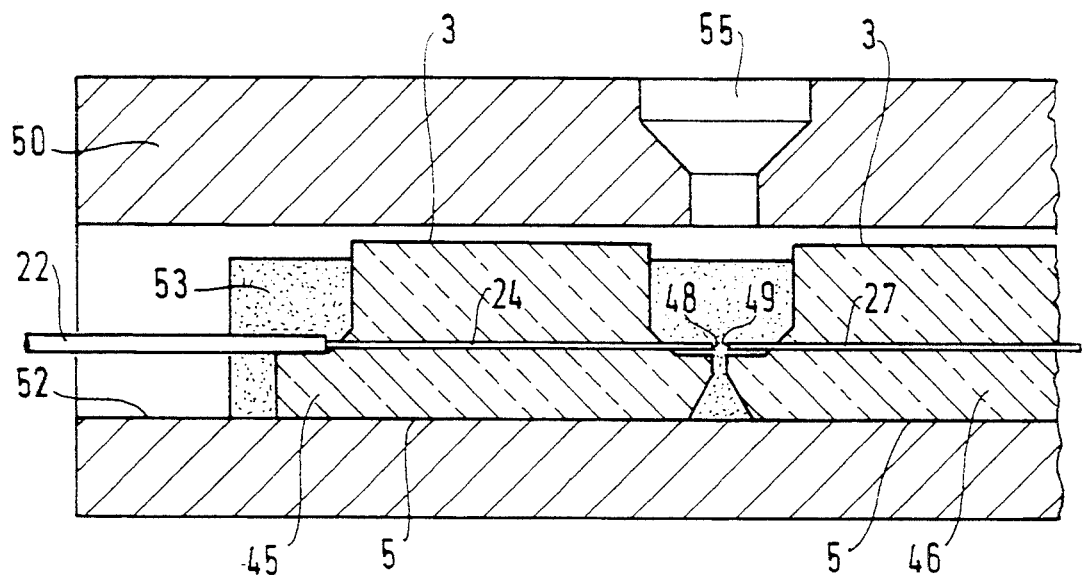
FIG. 11 shows the two sections from FIG. 10 joined together in a splicing body.
Figure 12:
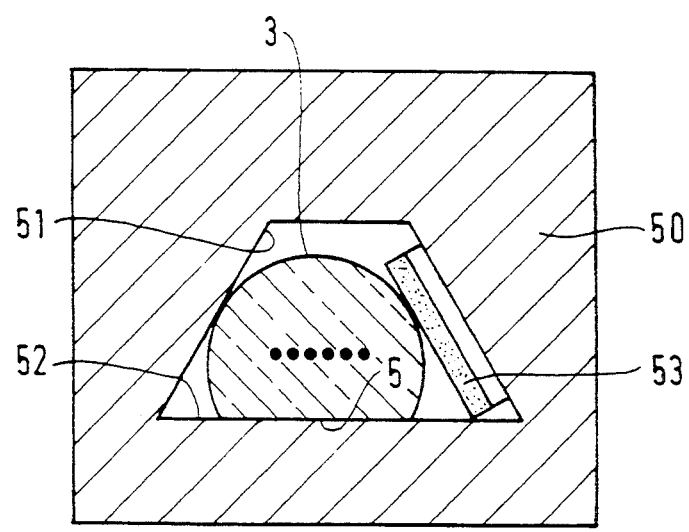
FIG. 12 is a side view of the body from FIG. 11.

FIGS. 11 and 12 show a splicing body 50 for aligning and mechanically fixing the two sections 45 and 46. The reference faces 3 and 5 are applied to faces 51 and 52 of the splicing body by an elastically deformable leaf spring 53 (see FIG. 12). Before the sections 45 and 46 are brought into contact, a gel for matching the refractive indices at the interfaces 48 and 49 is injected via the orifice 55.

Evidently, to connect an optical fiber cable to the other end of the waveguides 23 of the integrated optical device 21 it is sufficient to carry out the same operations as above on a second half of the connection subassembly on the opposite side of the device 21.

This method in accordance with the invention for preparing a connection subassembly enables the delicate operation of connecting the integrated optical device to an intermediate cable to be carried out in the manufacturing plant. Because of the method employed there is no need for time-consuming and costly optical polishing. The required optical quality is obtained by very accurate cutting of the fiber ends, this cutting being facilitated by the fixing of the fibers in a multiferrule.

The method of connecting an optical cable to the subassembly prepared in this way on site does not involve any delicate operations and is simple and easy for relatively unskilled personnel to carry out under difficult working conditions. The cost of the connection is therefore reduced, the optical quality is as good as in the prior art methods and the process is easier to use.

The problems that have previously arisen are solved by the use in accordance with the invention of an intermediate cable making the connection between the main cable and the integrated optical device to which it is to be connected.

Figure 15:
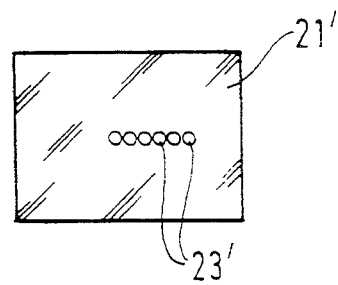
FIG. 15 is a view in transverse cross-section of an integrated optical device used in the second embodiment of the invention.

A second method of preparing a connection subassembly will now be described. This subassembly is for connecting a cable 22 comprising six optical fibers 24 with their cladding and an integrated optical device comprising six waveguides 23' (see FIG. 15) with a diameter of 125 $\mu$m and equidistantly spaced by 125 $\mu$m.

Figure 13:
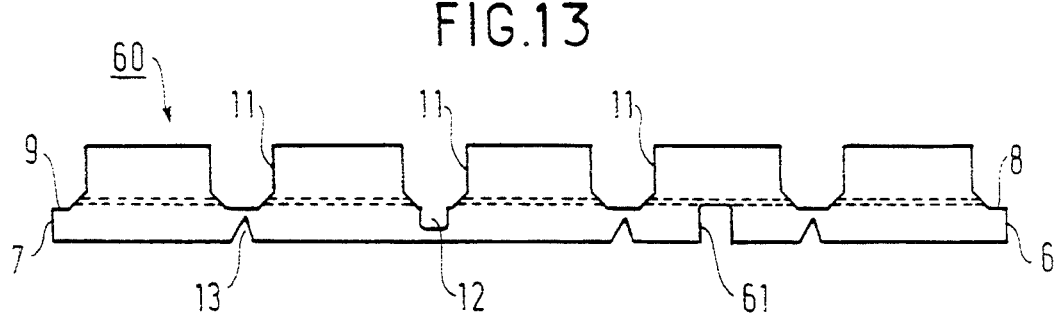
FIG. 13 is a diagrammatic view in elevation of a multiferrule used in a second embodiment of the method in accordance with the invention.
Figure 14:
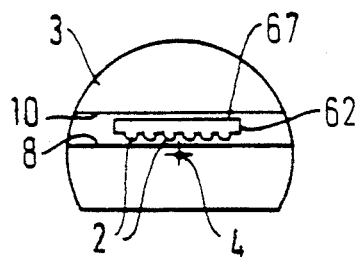
FIG. 14 is a side view of the multiferrule from FIG. 13.

FIG. 13 shows a multiferrule 60 identical to the multiferrule 1, with two exceptions:
- a groove 61 orthogonal to the plane of the passages 2 opens at the bottom into the passages 2 and is located between two of the grooves 11, preferably near the face 6 of the multiferrule 60, and on the opposite side of the diametral plane of the passages 2 to the grooves 11, i.e. on the same side as the groove 12,
- a slot 62 (see FIG. 14) passes completely through it in the longitudinal direction, parallel to the plane of the passages 2 and having one edge in this plane; the passages 2 all open into the slot 62 which is in part above their plane, i.e. on the same side as the grooves 11.

The multiferrule 60 is easy to produce by the method disclosed in the patent application EP-A-0 484 850: it is sufficient to produce two blanks, one having semicircular grooves and the other having a rectangular cross-section groove adapted to face the semicircular grooves when the two blanks are assembled together.

The width of the slot 62 in the plane of the passages 2 is equal to at least $11 \times 125$ $\mu$m, i.e. 1.375 mm (the diameter of the passages 2 is 125 $\mu$m and that the distance between the axes of two adjacent passages is 250 $\mu$m).

The method of preparing the connection subassembly in this second embodiment of the invention will be described below in terms of those operations which differ from those of the method of preparing the connection subassembly 36 in the first embodiment of the invention.

After insertion of the intermediate fibers 27 into the passages 2 via the face 7, and before they are fixed, a pressure force is applied to the fibers 27 (schematically represented by an arrow 64 in FIG. 16) in a direction orthogonal to the diametral plane of the passages 2 by means of a rod 63 in one of the grooves 11, preferably a groove between the groove 12 and the face 7 of the multiferrule 60. The rod 63 is in direct contact with the fibers 27. The force 64 immobilizes the fibers 27 in the passages 2.

A pressure force (schematically shown by the arrow 65 in FIG. 16) is applied to the fibers 27 at the groove 61 in a direction orthogonal to the plane of the passages 2 by means of a rod 66 in the groove 61 and in direct contact with the fibers 27. The force 65 forces all of the fibers 27 in the groove 62 into contact with the upper side 67 of the latter (see FIG. 17).

Figure 16:
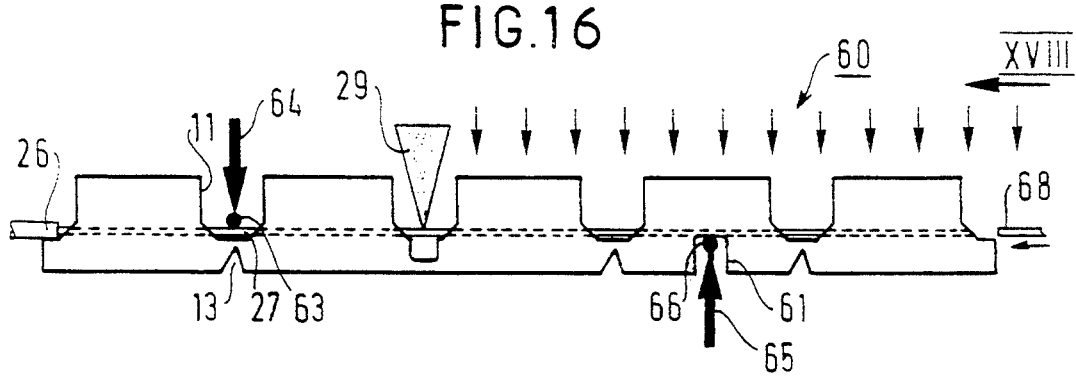
FIG. 16 shows the multiferrule from FIG. 14 after insertion of the intermediate fibers and abutment of their end parts against the upper edge of the slot and with the part for bringing together the end parts inserted in the slots.
Figure 17:
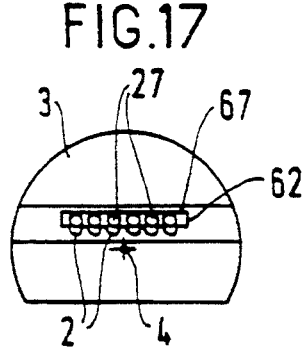
FIG. 17 is a side view as in the direction XVIII in FIG. 16 before insertion of the part for bringing together the end parts.
Figure 18:
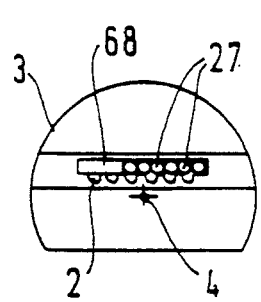
FIG. 18 is the same view as FIG. 17 showing the part for bringing together the end parts.

Once the fibers 27 are in the slot 62, a parallelepiped-shaped block 68 of silica glass is inserted into the slot through the face 6 of the multiferrule 60 (see FIG. 16 and 18). The effect of this is to close up the end portions of the fibers 27 near the face 6. The width of the block 68 in the plane of the passages 2 is such that the fibers 27 are in contact with each other over a portion of their length equal to the length of the block 68. The spacing between the fibers 27 over this portion is therefore equal to that of the waveguides 23' in the integrated optical device 21'.

When these operations have been done the cable 26, the fibers 27 and the block 68 are immobilized in the multiferrule 60 between the groove 12 and the face 6.

The subsequent cutting operation is preferably effected at the groove 11 between the groove 61 and the face 6 of the multiferrule 60 so as to cut simultaneously the multiferrule 60, the fibers 27 and the block 68 and so that a groove 11 is left between the groove 12 and the cut end. The cut ends of the fibers 27 are therefore disposed in exactly the same way as the waveguides 23'; it is no longer any problem to connect the fibers 27 to the integrated optical device 21'.

The fibers 27 may then be cut transversely at the groove 12 using the cutter 29 and the cut portions of fiber that are not fixed removed.

There is finally obtained a connection subassembly for subsequent use in a method of connecting to the main optical cable 22 exactly as described with reference to FIGS. 8 through 12.

Figure 21:
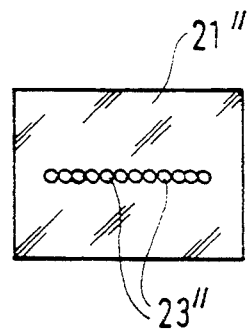
FIG. 21 is a view in transverse cross-section of an integrated optical device used in the third embodiment of the invention.

A third method of preparing a connection subassembly will now be described. This subassembly is for connecting two cables 22 each comprising six optical fibers 24 with their cladding and an integrated optical device 21" comprising 12 waveguides 23" (see FIG. 21) with a diameter of 125 μm and equidistantly spaced by 125 μm.

Figure 19:
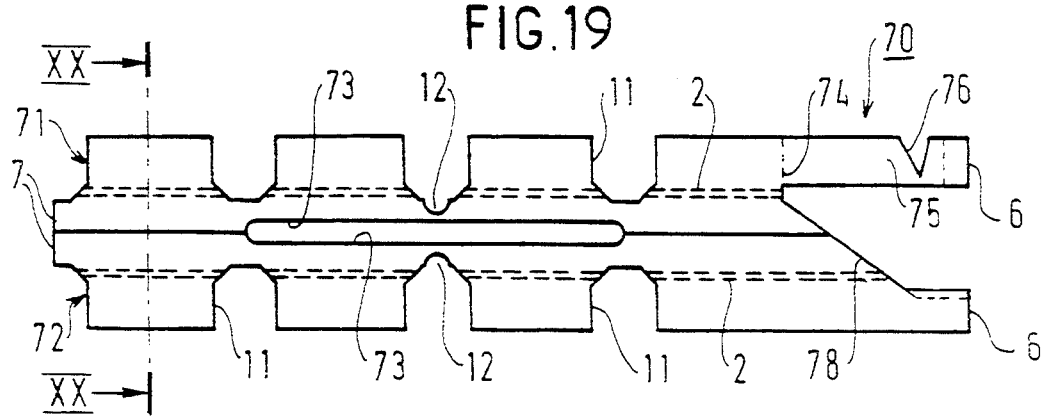
FIG. 19 is a diagrammatic view in elevation of a multiferrule used in a third embodiment of the method in accordance with the invention.
Figure 20:
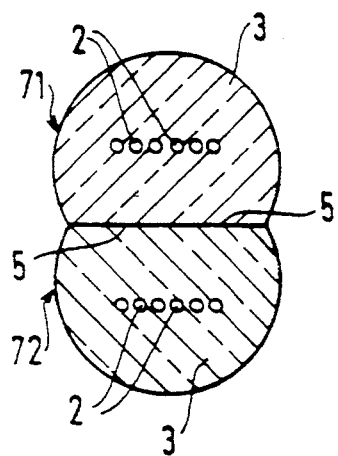
FIG. 20 is a view in cross-section on the line XX—XX in FIG. 19.

FIGS. 19 and 20 show a multiferrule 70 obtained by assembling two primary multiferrules 71 and 72.

Figure 23:
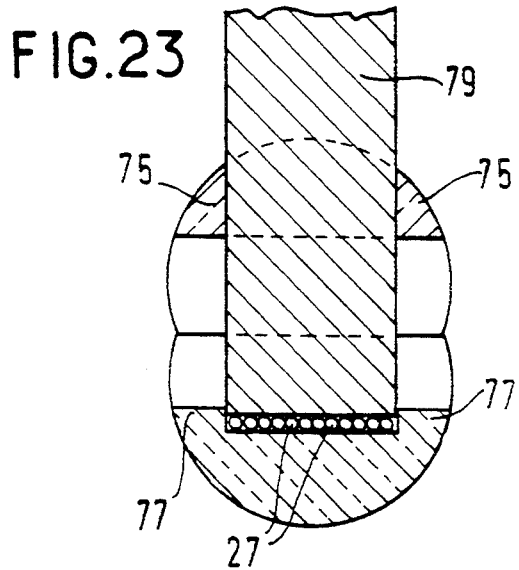
FIG. 23 is a view in cross-section on the line XXII—XXII in FIG. 22.

The multiferrules 71 and 72 are similar to the multiferrule 1 except as follows:

the face 5 of the multiferrules 71 and 72 includes a groove 73 so that the multiferrule 70 obtained by assembling the multiferrules 71 and 72 together with their faces 5 one against the other incorporates a void intended to facilitate subsequent cutting into sections, only three grooves 11 are provided in each of the multiferrules 71 and 72, near the face 6 of the multiferrule 71 part of the latter is removed so that the passages 2 open to the exterior at a section 74 which is set back relative to the face 6 of the multiferrule 72 in the composite multiferrule 70; the section 74 is between two cantilever arms 75 (see FIG. 23) which extend horizontally as far as the face 6 of the multiferrule 72 and in which V-shaped grooves 76 orthogonal to the plane of the passages 2 of the multiferrule 71 are formed to create areas of weakness to facilitate subsequent cutting of the multiferrule 70 into sections (only one of the V-shaped grooves 76 can be seen in FIG. 19), the passages 2 of the multiferrule 72 open near the face 6 into a slot 77 (see FIG. 23) parallel to their plane and the bottom of which extends that of the passages 2; part of the multiferrule 72 has been removed so that the slot 77 opens towards the multiferrule 71, the multiferrule 70 is machined near the faces 6 of the multiferrules 71 and 72 so that the section 74 is joined to the slot 77 by an inclined surface 78.

As with the second embodiment of the invention the multiferrule 70 is easy to produce by the method disclosed in the patent application EP-A-0 484 850.

The width of the slot 77 in the plane of the passages 2 is equal to the sum of the diameters of the fibers 27.

The method of preparing the connection subassembly in the third embodiment of the invention will be described below in terms of those of operations which differ from those of the method of preparing the connection subassembly of the first embodiment of the invention.

Figure 22:
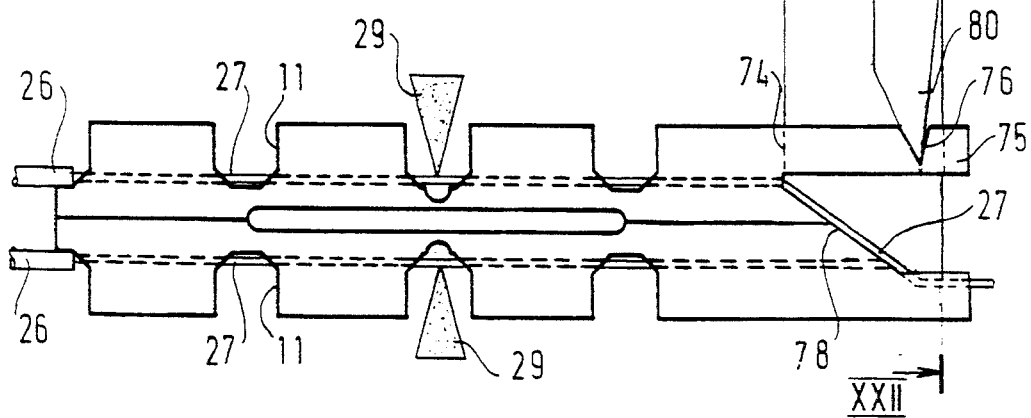
FIG. 22 shows the multiferrule from FIG. 19 after inserting the intermediate fibers and fitted with a part for deflecting the fibers from a higher level into the plane of the fibers of a lower level.

Two intermediate cables 26 identical to the cables 22 are used (see FIG. 22) each having six fibers 27. The stripped fibers 27 of each cable 26 are inserted via the faces 7 into the passages 2 of each of the multiferrules 71 and 72 in the same way as the fibers 27 of the intermediate cable 26 are inserted into the passages 2 of the multiferrule 1. The fibers 27 inserted into the passages 2 of the multiferrule 71 extend beyond the section 75 and are slightly longer than the fibers 27 inserted into the passages 2 of the multiferrule 72.

Before the fibers 27 are fixed in the passages 2 a silica glass block 79 whose exterior surface is complementary to the portions of the multiferrule 70 removed to form the arms 75 and the inclined surface 78 is applied to the fibers 27 projecting beyond the passages 2 of the multiferrule 71 so that the fibers are pressed against the inclined surface 78 and into the slot 77 where they are interleaved with the fibers 27 already present in the multiferrule 72.

Given the width of the slot 77, all the fibers 27 are disposed side by side in the slot in an arrangement identical to that of the waveguides 23" in the integrated optical device 21".

The block 79 includes a V-shaped groove 80 aligned with and deeper than the V-shaped groove 76 of the multiferrule 71. The V-shaped groove 80 is adapted to facilitate subsequent cutting of the multiferrule 70 at the part 79.

After the fibers 27 have been fixed in the slot 77 and in the passages 2 and after the block 79 has been fixed in the multiferrule 70 the assembly is cut at the V-shaped grooves 76 and 80 and the device 21" is connected to the cut ends of the 12 fibers 27.

The fibers 27 may then be cut transversely at the grooves 12 using cutters 29 and the cut portions of the fibers that are not fixed removed.

Figure 24:
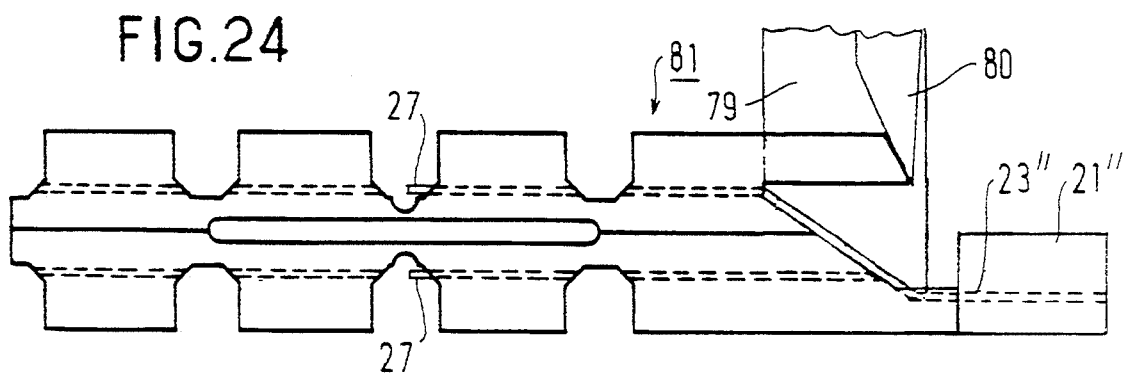
FIG. 24 is a diagrammatic view of the connection subassembly using the multiferrule from FIG. 19.

There is finally obtained a connection subassembly 81 (see FIG. 24) ready to be used to connect the device 21" to two cables 22 inserted via the face 7 of the multiferrules 71 and 72.

The invention enables any integrated optical device to be connected to an optical fiber cable by using the appropriate multiferrule. Although the preparation process in the manufacturing plant differs according to how the waveguides are disposed in the integrated optical device, the method used on site is always the same. The invention thus makes it possible to save time on site. Further, the on-site connection process is less complex than in the prior art and can be carried out at reduced cost by relatively unskilled personnel.

Figure 25:
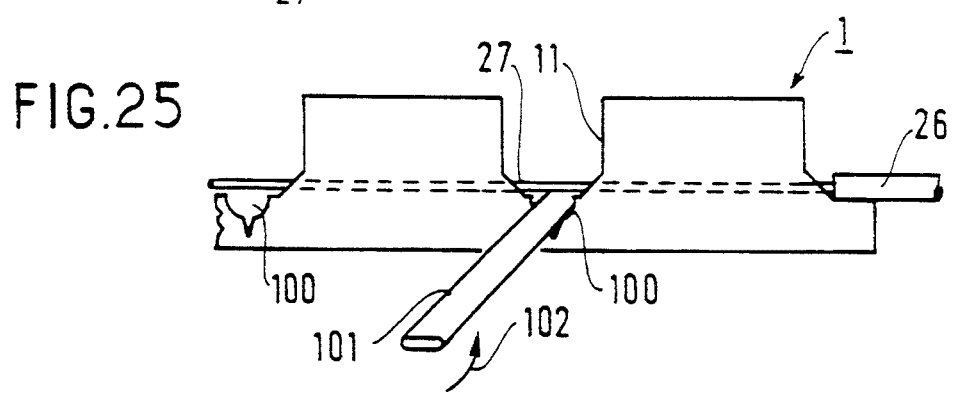
FIG. 25 shows an improvement to a multiferrule used in any of the embodiments of the invention.
Figure 26:
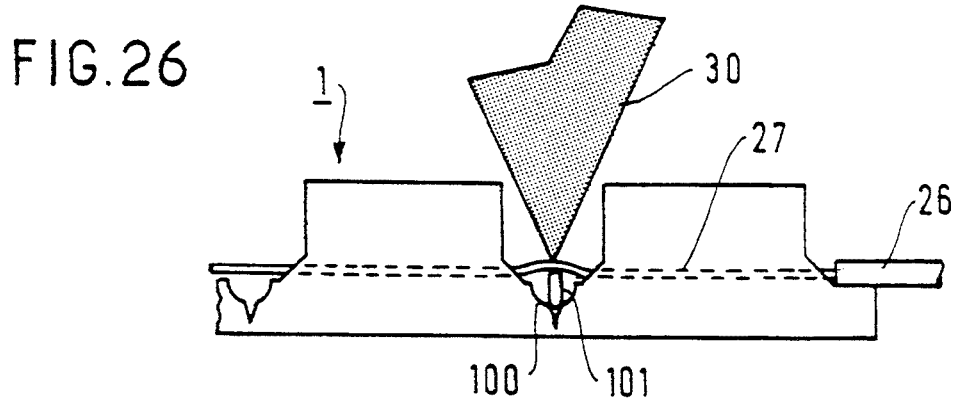
FIG. 26 shows the improvement from FIG. 25 during the stage in which the optical fibers are cut.

An improvement to the multiferrules used in putting the invention into effect is shown in FIGS. 25 and 26, with particular reference to the multiferrule 1 but applicable to any multiferrule used in any of the methods of the invention.

To facilitate cutting the fibers 27 and the multiferrule 1 at the same place, for example, a groove 100 may be formed in the multiferrule at the level of the groove 11 in which the cut is made, this groove 100 communicating with the groove 11 and being situated under the diametral plane of the passages 2.

Cutting is then a two-stage process. In the first stage an elliptical cross-section rod 101 is placed in the groove 100 with its major axis parallel to the plane of the passages 2. The rod 101 is then turned through 90° in the direction of the arrow 102 until its minor axis is parallel to the plane of the passages 2. The effect of this is to curve the fibers 27 (see FIG. 26) which, as is well known, improves the quality of cutting by the cutter 30 to produce a very flat cut section.

In a second stage, when the fibers 27 have been cut, the multiferrule 1 is cut in alignment with the groove 100. In this case it is no longer necessary to use additional grooves like the V-shaped grooves 13.

This improvement can facilitate cutting the fibers and the multiferrule at the same cross-section by breaking the cutting process down into two operations and also improve the optical quality of the cut fiber ends. It may also be applied to cutting of the fibers 27 at the groove 12.

The invention is obviously not limited to the embodiments just described.

In particular, the fibers 27 may be cut at the groove 12, after the fibers 27 are fixed, at any time prior to connection of the main cable or cables.

Also, the block 68 which groups the fibers together in the second method of preparing the connection subassembly need not be parallelepiped-shape but could instead have the shape of a non-parallel sided wedge with a cross-section reducing progressively within the slot 62. In this case it is important to cut the multiferrule 60 at a cross-section where the fibers 27 are disposed in exactly the same way as the waveguides 23′.

In the second embodiment two grouping blocks may be used in the slot 62, on opposite sides of the fibers 27, in order to center the fibers 27 in the slot 62.

The blocks 68 and 79 are preferably made from the same material as the multiferrule, for various reasons:
this material is transparent, enabling the use of an adhesive polymerized by an ultraviolet light,
it achieves good adhesion between the blocks 68 or 69 and the respective multiferrules 60 or 70.

Also, the use of a vitreous material for the blocks 68 and 69 makes them easier to cut.

Nevertheless, the blocks 68 and 79 may be made from other materials having the aforementioned characteristics but different than the material of the multiferrule.

Finally, any means may be replaced by equivalent means without departing from the scope of the invention.

What is claimed is:

1. Method of preparing a connection subassembly for splicing an integrated optical device, containing a plurality of waveguides, to at least one main optical fiber of an optical fiber main cable, comprising the steps of:
providing a multiferrule which is made from a vitreous material having a plurality of parallel, longitudinally extending internal passages (2) opening onto opposite first and second faces (6, 7);
providing an optical-fiber intermediate cable (26) comprising the same number of intermediate fibers (27) as there are main fibers in said main cable;
inserting a stripped end of each of said intermediate fibers (27) via said first face (6) into a respective one of said passages (2) so that each said stripped end extends to the vicinity of said second face (7);
fixing said intermediate fibers (27) in said passages (2) over only a distance less than the length of said passages (2) so that a portion of said intermediate fibers that is adjacent said second face (7) is not fixed in said passages (2);
transversely severing only said intermediate fibers (27) at a cross-section near said second face (7) where said intermediate fibers are not fixed in said passages;
removing the severed intermediate fibers via said second face (7) from said passages (2) thereby leaving said passages empty over a part of their length to receive the main optical fibers of the optical fiber main cable;
cutting both said multiferrule and said intermediate fibers (27) transversely to said intermediate fibers (27), and at a cross-section in which said intermediate fibers are fixed; to obtain a first multiferrule section (34); in which said intermediate fibers are partially fixed and which comprises said second face (7) and a cut face having cut ends of the intermediate fibers flush therewith, and a second multiferrule section (35) which comprises said first face (6);
discarding said second multiferrule section; and
connecting said cut face of said first section (34) to one face of said integrated optical device (21) so that the cut ends of said intermediate fibers are in alignment with the waveguides (23) of said integrated optical device,
to produce said connection subassembly (36).

2. Method according to claim 1 characterized in that said waveguides (23) of said integrated optical device (21) are so disposed that their axes are coplanar, the distance between two consecutive waveguides (23) in said plane is the same for all said waveguides and equal to the diameter of said intermediate fibers (27) before stripping and the diameter of said waveguides (23) is substantially equal to the diameter of said intermediate fibers (27) after stripping.

3. Method of preparing a subassembly for splicing an integrated optical device to at least one main optical fiber of an optical fiber main cable characterized in that:
a multiferrule (60) is used which is made from a vitreous material having a series of parallel internal passages (2) in a common diametral plane opening onto opposite first and second faces (6, 7), said multiferrule (60) having a slot (62) parallel to the plane of said passages (2) into which said passages open,
an optical fiber intermediate cable (26) is used comprising the same number of intermediate fibers (27) as there are main fibers in said main cable,
the stripped end of each of said intermediate fibers (27) is inserted via said second face (7) into a respective one of said passages (2) so that said ends extend to the vicinity of said first face (6), a force (65) is applied to said intermediate fibers (27) in a direction orthogonal to the plane of said passages (2) to urge their end portions near said first face (6) into said slot (62) and into contact with one side (67) of said slot (62) parallel to the plane of said passages, at least one block (68) is inserted through said first face (6) into said slot (62) to move said end portions closer together so that, at a cross-section near said first face (6), said intermediate fibers (27) are in contact with each other, said block (68) is fixed in said multiferrule (60) and said intermediate fibers (27) are fixed in said passages (2) over a length less than that of said passages (2) so that a portion of said intermediate fibers (27) near said second face (7) is not fixed in said passages (2), said block (68), said multiferrule (60) and said intermediate fibers (27) are first-cut transversely to said intermediate fibers (27) at a cross-section in which said intermediate fibers (27) are fixed and in contact with each other to obtain a first multiferrule section in which said intermediate fibers are partially fixed and comprising said second face (7) and a second section which comprises said first face (6) and which is discarded, said first section is connected to one face of said integrated optical device (21') so that the ends of said first-cut fibers are flush with the face of said section opposite said second face (7) in alignment with the waveguides (23') of said integrated optical device (21'), said intermediate fibers (27) are second-cut transversely at a cross-section near said second face (7) and where said intermediate fibers (27) are not fixed in said passages (2) and the second-cut fibers are removed to leave said passages (2) empty over part (60) of their length to produce said connection subassembly.

4. Method according to claim 3 characterized in that said force (65) is applied to said intermediate fibers (27) by means of at least one rod (66) housed in a groove (61) orthogonal to the plane of said passages (2), opening at the bottom into said passages (2) and on the opposite side of the plane of said passages (2) to the side (67) of said slot (62) against which said end portions are urged.

5. Method according to claim 3 characterized in that said intermediate fibers are retained by means of at least one cylindrical rod (63) housed in a groove (11) orthogonal to the plane of said passages (2), opening at the bottom into said passages (2) and on the same side of the plane of said passages (2) as the side (67) of said slot (62) against which said end portions are urged.

6. Method according to any one of claims 3 to 5 characterized in that two blocks are inserted into said slot (62) on either side of said intermediate fibers (27) so as to center said intermediate fibers (27) in said slot (62).

7. Method according to claim 6 characterized in that each block (68) is made from a vitreous material identical to that of said multiferrule (60).

8. Method according to any one of claims 3 to 5 characterized in that said block (68) is made from a vitreous material identical to that of said multiferrule (60).

9. Method according to any one of claims 3 to 5 characterized in that said waveguides (23') of said integrated optical device (21') are disposed so that their axes are coplanar, the spacing between two consecutive waveguides (23') in said plane is the same for all said waveguides and equal to the diameter of said intermediate fibers (27) after stripping and the diameter of said waveguides (23') is substantially equal to the diameter of said intermediate fibers (27) after stripping.

10. Method of preparing a subassembly for splicing an integrated optical device to at least one main optical fiber of each of at least two optical-fiber main cables characterized in that:

a multiferrule (70) is used which is made from a vitreous material having two series of parallel internal passages (2) in two separate parallel planes, said passages (2) opening onto opposite first and second faces (6, 7) of said multiferrule (70) which is formed by assembling together two primary multiferrules (71, 72) each comprising one of said series of passages, one of said primary multiferrules (71) being shorter than the other (72) so that said first face (6) at the level of said first series is set back relative to said first face (6) at the level of said second series, the passages (2) of said second series opening in the vicinity of said first face (6) into a slot parallel to their plane, having a width equal to the sum of the diameters of all the passages (2) and opening towards said second series, the portion of said multiferrule (70) between said first and second series forming a surface (76) inclined to the planes of said first and second series, two intermediate cables (26) are used, each comprising the same number of intermediate fibers (27) as there are main fibers in one of said main cables, the stripped end of each of said intermediate fibers (27) is inserted into a respective one of said passages (2) via said second face (7) so that said ends reach as far as the vicinity of said first face (6) and the intermediate fibers (27) of each of said intermediate cables are in respective passages (2) of both said series, an appropriately shaped block (79) is used to urge said intermediate fibers (27) of said first series against said inclined surface (78) so that their ends are in the plane of said intermediate fibers (27) of said second series and interleaved therewith in said slot so that said intermediate fibers (27) are all in contact with each other, said intermediate fibers (27) are fixed in said passages (2) over a distance less than the length of said passages (2) so that a portion of said fibers near said second face (7) is not fixed in said passages (2), said multiferrule (70), said block (79) and said intermediate fibers (27) are first-cut transversely to said intermediate fibers at a cross-section in which said intermediate fibers (27) are fixed and all in contact with each other to obtain a first multiferrule section in which said intermediate fibers (27) are partially fixed and comprising said second face (7) and a second section which comprises said first face (6) and is discarded, said first section is connected to one face of said integrated optical device (21") so that the ends of said first-cut fibers are flush with the face of said section opposite said second face (7) in alignment with the waveguides (23") of said integrated optical device, said intermediate fibers (27) are second-cut transversely at a cross-section near said second face where said intermediate fibers are not fixed in said passages and the second-cut fibers are removed to leave said passages of said first and second series empty as far as a central part of said multiferrule (70) to obtain said connection subassembly.

11. Method according to claim 10 characterized in that said block (79) is made from a vitreous material identical to that of said multiferrule.

12. Method according to claim 10 or claim 10 characterized in that the number of said waveguides (23") of said integrated optical device (21") is equal to the number of said intermediate fibers (27) of said two intermediate cables (26) and said waveguides are disposed so that their axes are coplanar, the spacing between two consecutive waveguides in said plane is the same for all said waveguides and equal to the diameter of said intermediate fibers after stripping and the diameter of said waveguides is substantially equal to the diameter of said intermediate fibers after stripping.

13. Method according to any one of claims 1, 3 or 10 for connecting a subassembly to at least one optical fiber main cable characterized in that:
the stripped ends of each of said main fibers (24) of said main cable (22) are inserted into respective passages (2) via said second face (7) of said subassembly (36) so that said ends reach as far as said intermediate fibers (27),
said main fibers (24) are immobilized (38) in said passages (2),
said multiferrule (1) and said main fibers (24) and said multiferrule (1) and said intermediate fibers (27) are cut transversely to said fibers at two cross-sections (43, 44) in which said fibers are fixed to obtain two multiferrule sections (45, 46) respectively attached to said main cable (22) and to said integrated optical device (21) and an intermediate section (47) which is discarded,
said two multiferrule sections (45, 46) are aligned in a splicing body (50) by guiding exterior reference faces (3) of said sections and, before contact is established, a gel (53) is injected into said body for matching the refractive indices at the interfaces of said fibers.

14. Method according to any one of claims 1, 3 or 10 characterized in that an adhesive polymerized by ultraviolet light is introduced into said passages before said fibers are inserted therein in order to fix said fibers in said multiferrule.

15. Method according to any one of claims 1, 3 or 10 characterized in that cutting said multiferrule (1) into sections is facilitated by weakened areas (13) transverse to said passages (2).

16. Method according to any one of claims 1, 3 or 10 characterized in that parallel cutting grooves (11) orthogonal to the plane of said passages (2) and opening into said passages are provided for cutting said sections.

17. Method according to claim 16 characterized in that additional grooves (13) are provided for creating weakened areas in line with said cutting grooves (11) and on the opposite side of said multiferrule (1).

18. Method according to claim 17 characterized in that said additional grooves (13) have an asymmetric V-shape.

19. Method according to any one of claims 1, 3 or 10 characterized in that said second face (7) of said subassembly (36) has a bearing surface (9) for the insulative material sheaths of said main cables (22).

20. Method according to any one of claims 1, 3 or 10 characterized in that the ends of said passages (2) are chamfered (10) to facilitate inserting said fibers.

21. Method according to any one of claims 1, 3 or 10 characterized in that, for cutting said intermediate fibers (27) before removing them to leave said passages (2) empty as far as a central part of said multiferrule (1), a groove (12) is made in the latter orthogonal to the plane of said passages (2), opening into said passages and at the cutting cross-section.

22. Method according to any one of claims 1, 3 or 10 characterized in that, to cut said multiferrule (1) and said intermediate fibers (27) at the same cross-section, said intermediate fibers (27) are first cut while curved (101) and said multiferrule (1) is cut after said intermediate fibers (27) are cut.

23. Method according to any one of claims 1, 3 or 10 characterized in that said integrated optical device (21, 21', 21") is connected at its other face onto which said waveguides open to one or more other optical fiber intermediate cables (26) by a method identical to that used to connect the first optical fiber intermediate cable or cables to said integrated optical device and said subassembly then comprises said integrated optical device (21, 21', 21") connected to intermediate cables (26) on either side by means of two multiferrules.

24. A subassembly for splicing an integrated optical device, containing a plurality of waveguides, to at least one main optical fiber of an optical-fiber main cable, characterized in that the subassembly comprises:
a vitreous material multiferrule section having a plurality of parallel and coplanar internal passages opening onto two opposite faces of said section, and a slot parallel to the plane of said passages, said passages opening into said slot,
a plurality of stripped intermediate optical fibers inserted into said passages, flush with the section face onto which said slot opens, said stripped intermediate fibers being in contact at their ends with one side of said slot parallel to the plane of said passages and urged together at their ends so as to be in contact with each other near said face with which they are flush, said stripped intermediate fibers being fixed in said passages over only a part of a length thereof from said face with which said stripped intermediate fibers are flush, said passages being empty near the other face of said section and over part of their length measured from said other face, and
an integrated optical device connected to said opposite face of said section with which said intermediate optical fibers are flush so that the waveguides of said integrated optical device are aligned with said intermediate optical fibers.

25. A subassembly for splicing an integrated optical device, containing a plurality of waveguides, to at least two main optical fibers of an optical-fiber main cables, characterized in that the subassembly comprises:
a vitreous material multiferrule section having two series of parallel internal passages in two separate parallel planes opening onto two opposite faces of said section, said section being formed by assembling together two primary multiferrule sections each comprising one of said series of passages, one of said primary sections being shorter than the other, the passages of the longer primary section opening near one of the faces of said section into a slot parallel to their plane, having a width equal to the sum of the diameters of all the passages of said primary section and opening towards the other series of passages, the section between said two series forming an inclined surface parallel to the planes of said two series, a plurality of stripped intermediate optical fibers inserted into said passages of both said series, the intermediate optical fibers inserted into the passages of the shorter primary section being urged by an appropriately shaped block against said inclined surface, and having ends that are in the plane of the intermediate optical fibers of the other series of passages and interleaved with the latter in said slot, all of the intermediate optical fibers being in contact with each other and all flush with one face of said section, all of said intermediate fibers being fixed in said passages over only a part of a length thereof measured from said face with which they are all flush, said passages being empty in the vicinity of the other face of said section and over part of their length measured to as far as a central part of said section, and an integrated optical device connected to said face of said section with which said stripped intermediate optical fibers are flush so that the waveguides of said integrated optical device are aligned with said stripped intermediate optical fibers.

26. A subassembly for splicing an integrated optical device, containing a plurality of waveguides, to at least one main optical fiber of an optical-fiber main cable, characterized in that subassembly comprises:

a vitreous material multiferrule section having a plurality of parallel interior passages opening onto two opposite faces of said section, a plurality of stripped intermediate optical fibers that are inserted into said passages, flush with one of said two opposite face of said section and fixed in said passages over only a part of a length thereof measured from said one face with which they are flush, said passages being empty near the other opposite face of said section and over only a part of their length measured from said other opposite face, and an integrated optical device connected to said one face with which said intermediate optical fibers are flush so that the waveguides of said integrated optical device are in alignment with said intermediate optical fibers.

* * * * *